United States Patent
Bosman et al.

(10) Patent No.: US 10,289,750 B2
(45) Date of Patent: *May 14, 2019

(54) SHORT-TERM HASHES

(71) Applicant: Facebook, Inc., Menlo Park, CA (US)

(72) Inventors: Tudor Bosman, Pleasanton, CA (US);
Soren Bogh Lassen, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 388 days.

This patent is subject to a terminal disclaimer.

(21) Appl. No.: 14/855,977

(22) Filed: Sep. 16, 2015

(65) Prior Publication Data

US 2016/0004786 A1 Jan. 7, 2016

Related U.S. Application Data

(63) Continuation of application No. 13/799,772, filed on Mar. 13, 2013, now Pat. No. 9,171,063.

(51) Int. Cl.
*G06F 17/30* (2006.01)

(52) U.S. Cl.
CPC .. *G06F 17/30949* (2013.01); *G06F 17/30628* (2013.01); *G06F 17/30864* (2013.01); *G06F 17/30958* (2013.01)

(58) Field of Classification Search
CPC .................... G06F 17/30867; G06F 17/30864
See application file for complete search history.

(56) References Cited

U.S. PATENT DOCUMENTS

| | | | |
|---|---|---|---|
| 7,809,730 B2 | 10/2010 | Barsness et al. | |
| 2005/0120017 A1* | 6/2005 | Motoki | G06F 17/30985 |
| 2007/0027867 A1* | 2/2007 | Ichino | G06F 17/30985 |
| 2008/0120292 A1 | 5/2008 | Sundaresan et al. | |
| 2011/0004599 A1 | 1/2011 | Deninger et al. | |
| 2011/0137902 A1* | 6/2011 | Wable | G06F 17/30867 |
| | | | 707/737 |
| 2011/0179030 A1 | 7/2011 | Lee | |
| 2011/0264582 A1* | 10/2011 | Kim | G06Q 20/102 |
| | | | 705/40 |
| 2012/0005224 A1 | 1/2012 | Ahrens | |
| 2012/0016884 A1 | 1/2012 | Rowney | |
| 2012/0158782 A1 | 6/2012 | Transier et al. | |
| 2012/0185446 A1 | 7/2012 | Sundaresan | |

(Continued)

FOREIGN PATENT DOCUMENTS

| | | |
|---|---|---|
| CN | 101084499 A | 12/2007 |
| CN | 101145149 A | 3/2008 |

(Continued)

OTHER PUBLICATIONS

Kate Byrne, "Populating the Semantic Web—Combining Text and Relational Databases as RDF Graphs", Doctor of Philosophy, University of Edinburgh, 2008, 244 pp.*

(Continued)

*Primary Examiner* — Loc Tran
(74) *Attorney, Agent, or Firm* — Baker Botts L.L.P.

(57) ABSTRACT

In one embodiment, a server receives a search query; determines search terms based on the received search query, each search term including a prefix and a suffix, both of which correspond to elements of a social graph; and sends search results matching the prefix and suffix of a search term.

29 Claims, 4 Drawing Sheets

(56) References Cited

U.S. PATENT DOCUMENTS

2012/0221561 A1    8/2012  Brown
2013/0054631 A1    2/2013  Govani

FOREIGN PATENT DOCUMENTS

| CN | 102782682 A | 11/2012 |
|---|---|---|
| JP | 2011-501837 | 1/2011 |
| WO | WO 2004027653 A2 | 4/2004 |
| WO | WO 2011-142134 | 11/2011 |
| WO | WO 2012/091844 A1 | 7/2012 |
| WO | WO 2013/075986 A1 | 5/2013 |

OTHER PUBLICATIONS

Kate Byrne, Populating the Semantic Web—Combining Text and Relational Databases as RDF Graphs, 2008, University of Edinburgh, 244 pages. (Year: 2008).*

Australian Patent Examination Report No. 1 for AU Patent Application No. 2014249325 from the Australian Patent Office, dated Nov. 5, 2015.

Extended European Search Report received from the EPO, for European Patent Application No. 14780059.3-1507 / 2973070, dated Nov. 29, 2016.

Byrne, K., "Populating the Semantic Web—Combining Text and Relational Databases as RDF Graphs", Institute for Communicating and Collaborative Systems, University of Edinburgh, 2008 [retrieved from internet on Mar. 16, 2017] . URL:http://homepages.inf.ed.ac.uk/kbyrne3/docs/thesisfinal.pdf.

Examination Report received from the Australian IP Government, for Australian Patent Application No. 2016200273, dated Mar. 20, 2017.

Canadian Office Action received from the Canadian Intellectual Property Office for Canadian Application No. 2,919,451, dated May 18, 2017.

Sankar, S., et al. "Under the Hood: Building out the infrastructure for Grap Search." [Viewed on internet on Jun. 2, 2017.] URL: https://www.facebook.com/notes/facebook-engineering/under-the-hood-building-out-theinfrastructure-for-graph-search/10151347573598920/ >, published on Mar. 6, 2013.

Rasmussen, L., "I am the pointy-haired engineering director for Facebook's search team, AMA". [Viewed on internet on Jun. 5, 2017]. < URL: http://web.archive.org/web/20130219061600/https://www.reddit.com/r/IAmA/comments/18jb6d/i_am_the_pointyhaired_engineering_director_for/> published on Feb. 19, 2013 as per Wayback Machine.

Australian Examination Report received from the Australian IP Government for Australian Patent No. 2016200273, dated Jun. 6, 2017.

Chinese Office Action received from the State Intellectual Property Office of the People's Republic of China, for Chinese Patent Application No. 2014800269711, dated Apr. 8, 2016.

Japanese Notification of Reasons for Rejection for Application 2016-100488, dated Jan. 23, 2018.

CA Office Action received from CAIPO for Patent Application No. 2,919,451, dated May 2, 2018.

Communication regarding Application No. 17171731.7-1507 from European Patent Office, dated Dec. 1, 2017.

KR Notice of Allowance received from KIPO for Patent Application No. 10-2015-7035671. (with English Translation).

* cited by examiner

SHORT-TERM HASHES

PRIORITY

This application is a continuation under 35 U.S.C. § 120 of U.S. patent application Ser. No. 13/799,772, filed 13 Mar. 2013.

TECHNICAL FIELD

This disclosure generally relates to a social-networking system.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

Particular embodiments describe methods for indexing a database based on structures of search terms. Particular embodiments may represent a search term with a binary number and index search results of the search term by hashing the binary number. Instead of using a fixed length for binary numbers representing search terms, particular embodiments may reduce the lengths of the binary numbers by determining for each search term a prefix and a suffix of the each search term, and determining a length of a binary number representing the each search term based at least in part on an object type of the suffix of the each search term. Particular embodiments may thus reduce sizes of hash tables for indexing search terms with shorter-length binary numbers representing the search terms.

DESCRIPTION OF EXAMPLE EMBODIMENTS

Figure 1:
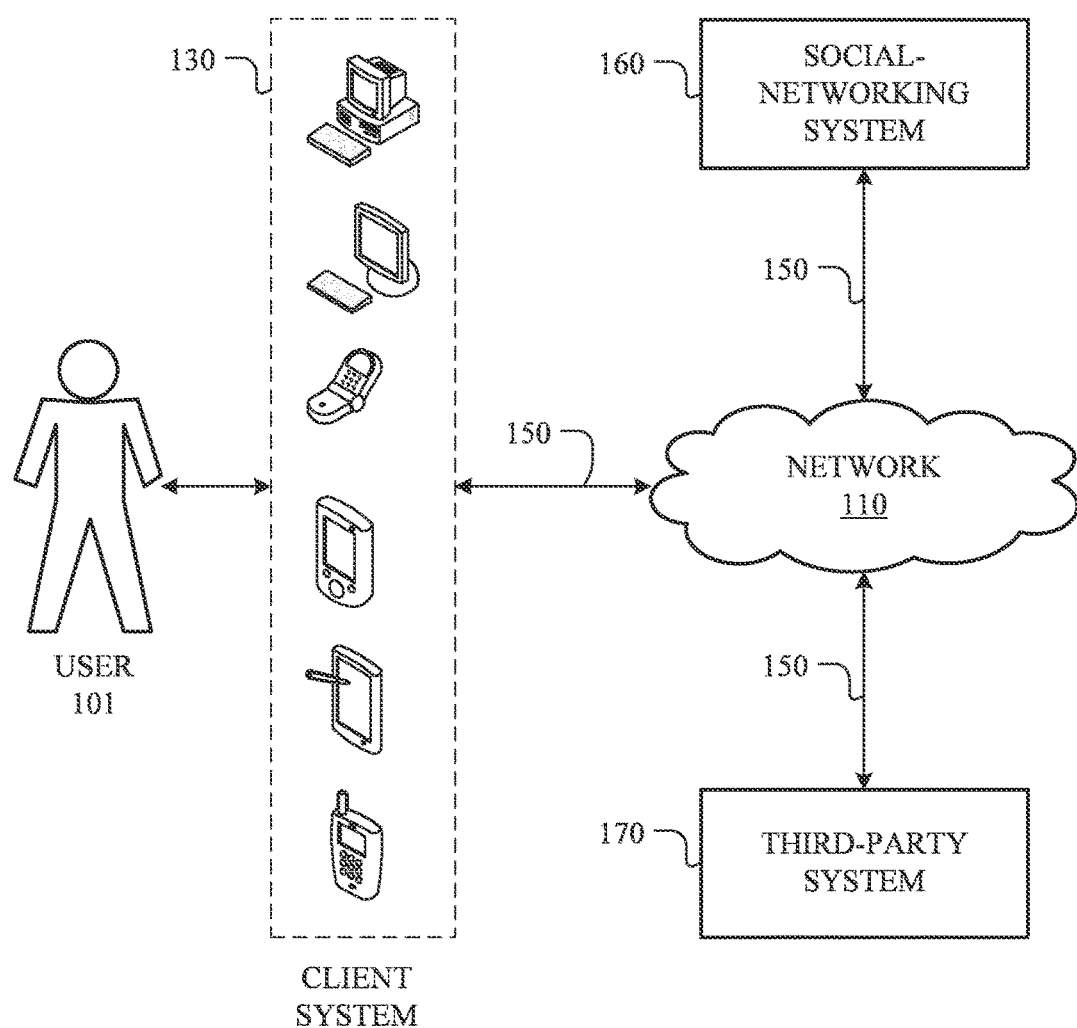
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g. an enterprise, business, or third-party application), or a group (e.g. of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users 101 to opt in to or opt out of having their actions logged by social-networking system 160 or shared with other systems (e.g. third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 170 may be a network-addressable computing system that can host websites and applications. Third-party system 170 may generate, store, receive, and send third-party system data, such as, for example, web pages, text, images, video, audio, or applications. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
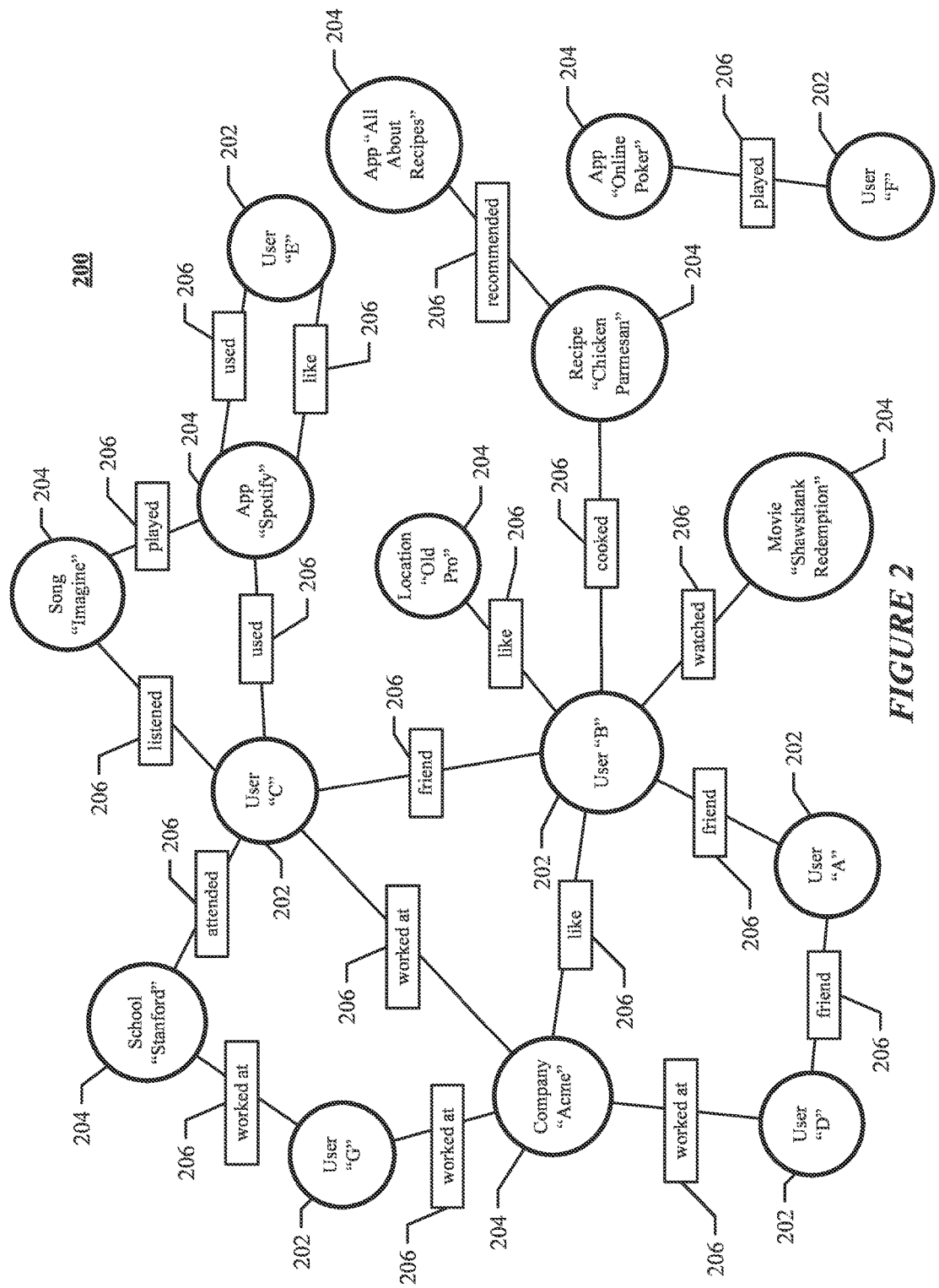
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g. an image of the cover page of a book); a location (e.g. an address or a geographical location); a website (which may be associated with a URL); contact information (e.g. a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g. "eat"), causing a client system 130 to send to social-networking system 160 a message indicating the user's action. In response to the message, social-networking system 160 may create an edge (e.g. an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In addition, the degree of separation between any two nodes is defined as the minimum number of hops (or edges) required to traverse the social graph from one node to the other. A degree of separation between two nodes can be considered a measure of relatedness between the users or the concepts represented by the two nodes in the social graph.

As described earlier, a social-networking system may store social-graph information and other social-networking system related information in one or more data stores. In particular embodiments, the information stored in the data stores may be organized according to specific data structures. Each data store may be a relational, columnar, correlation, or other suitable database. Particular embodiments contemplate any suitable types of database. In addition, each data store (or partition) may be held by separate servers or at separate physical locations. Particular embodiments may provide interfaces that enable the social-networking system, a client system, or a third-party system to manage, retrieve, modify, add, or delete, the information stored in the data stores.

A search query submitted to a database may include one or more keyword phrases such as "Pi", "Downton Abbey", "NBA All Star Game", or "tallest mountain in the world." A database may index search results of a keyword phrase by hashing the keyword phrase. For example, an index server of the database may store, modify, retrieve, or delete search results of a keyboard phrase by applying a hash function to the keyword phrase for a resulting hash value, and store or look up the search results in the database at a location corresponding to the resulting hash value. That is, a search index of the database may comprise a hash table associated with the hash function. However, as keyword phrases can be very long in length, just hashing keyword phrases may result in a very large search index for a database, and may cause higher cost or lower performance in accessing data stored in the database. Particular embodiments describe methods for reducing a size of a search index. Particular embodiments may determine one or more search terms for a search query for a database, and index the database based on structures of the search terms.

Figure 3:
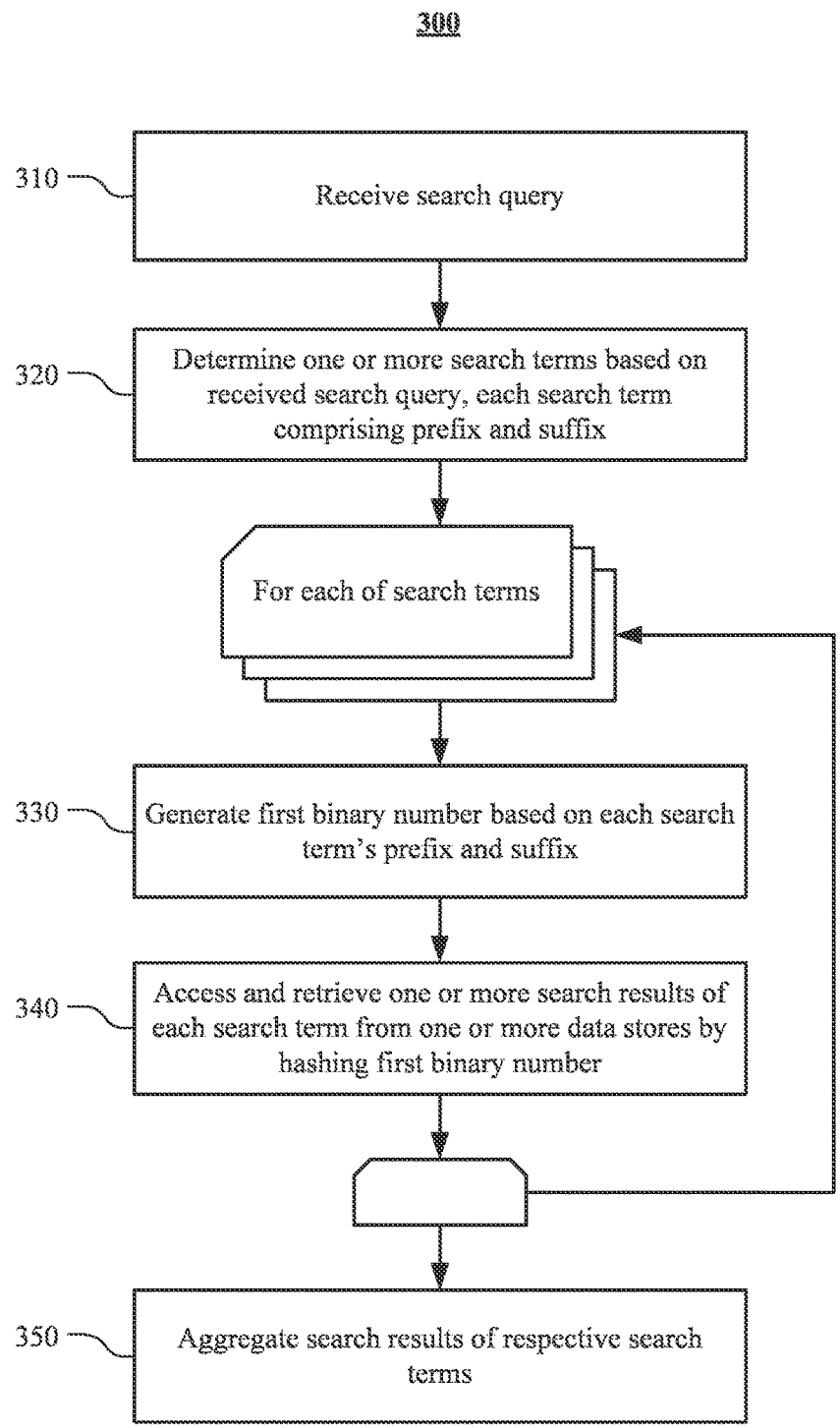
FIG. 3 illustrates an example method for indexing a database based on structures of search terms.

FIG. 3 illustrates an example method 300 for indexing a database based on structures of search terms. The method of 300 may be implemented by one or more computing devices (e.g., servers) of a social-networking system, or of any suitable system comprising one or more data stores or database. The method 300 may begin at step 310. In particular embodiments, at step 310, one or more computing devices of the social-networking system may receive a search query. For example, a received search query may comprise structured or substantially unstructured text string submitted by a user via a PHP (Hypertext Preprocessor) process hosted by the social-networking system. For example, the received search query can be "Who are common friends of John and Bob?", "Who are tagged in this photo?", "Find interesting places near San Carlos, Calif.", "Who among my friends checks in to this restaurant?", or "Who likes this post?".

In particular embodiments, at step 320, one or more computing devices of the social-networking system may determine one or more search terms based on the received search query. In particular embodiments, each search term may comprise a prefix and a suffix.

For example, for the received search query "Who are common friends of John and Bob?", the computing devices may determine a user identifier <177> for "John" and a user identifier <213> for "Bob." The computing devices may determine that the received search query may be composed of two search terms "friends:<177>" and "friends:<213>". Each of the determined search terms includes a prefix "friends:" (i.e., friends of) and a suffix in a user identifier (<177> or <213>). Expected search results of each search term may comprise list of user identifiers (e.g., a list of users who are friends of user <177>). The computing devices may determine results of the received search query by applying an AND operator to expected search results of the two determined search terms: (AND friends:<177> friends:<213>).

For example, the computing devices may determine that the received search query "Who are tagged in this photo" may be composed of a search term "tagged_in_photo:<65199>", with a prefix "tagged_in_photo" (i.e., users who are tagged in a photo) and a suffix in a photo identifier <65199> for "this photo." Expected results of the search term may comprise a list of user identifiers corresponding to users tagged in the photo <65199>.

For example, the computing devices may determine that the received search query "Find interesting places near San Carlos, Calif." may be composed of a search term "places_in:<752039>", with a prefix "places_in" (places in a map tile) and a suffix in a map tile identifier <752039> corresponding to "San Carlos, Calif." Here, a map may represent a geographic area, such as the world, a portion of the world, or any suitable area. The map may be divided into map tiles, where each map tile represents a particular geographic area of the map. For example, the map tile <752039> corresponding to San Carlos, Calif. may comprise a rectangular area with four corners of (37.52, −122.24), (37.52, −122.30), (37.47, −122.30), and (37.47, −122.24) in geographic coordinates. Expected results of the search term "places_in: <752039>" may comprise a list of identifiers of places (or any suitable concepts), where each place (or concept) has a location within the rectangular area of the map tile <752039>.

In particular embodiments, at step 330, for each of the search terms, the computing devices may generate a first binary number based on the each search term's prefix and suffix. The computing devices may generate a second binary number based on the prefix, and generate a third binary number based on an object type of the suffix. The computing devices may generate the first binary number by concatenating the second and the third binary numbers.

The computing device may first generate a second binary number for the each search term based on the each search term's prefix. For example, the computing devices may map a search term's prefix to a second binary number with a length of 10 bits. The length of 10 bits for the second binary number may enable the second binary number to represent up to about 1,000 ($2^{10}$) different prefixes such as "friends:", "tagged_in_photo:", and "places_in:" described earlier. Other examples of prefixes may include "posts_of:" (posts by a user), "commenters_of" (users who made comments about a post), and "likers_of" (users who like a post, a photo, or any suitable concept). Particular embodiments contemplate any suitable prefixes of search terms. The computing devices may access a mapping table stored in a data store of the social-networking system and look up the mapping table for a particular 10-bit binary number representing a particular prefix.

The computing devices may generate a third binary number for the each search term based on an object type of the each search term's suffix or the each search term's suffix object type. The computing devices may determine a length of the third binary number based on the object type of the each search term's suffix. The computing devices may determine a length of the third binary number for a particular object type such that the length is large enough to uniquely represent all possible objects of the particular object type stored in the social-networking system. The length of the third binary number may also be more than twice as large enough to uniquely represent all possible objects of the particular object type to avoid collisions associated with a hash function. Here, a collision may indicate that two different input values (hash keys) supplied to a hash function may result in an identical result (hash value). A collision does not have a one-to-one mapping property as desired for indexing. For example, the computing devices may generate a 37-bit binary number for a suffix of a user identifier. That is, a user identifier may be converted to a 37-bit binary number. A 37-bit binary number may be sufficient to uniquely represent $2^{15}$ different users of the social-networking system. For another example, the computing devices may generate a 64-bit binary number for a suffix of a concept identifier (e.g., an identifier for a place). That is, a concept identifier may be converted to a 64-bit binary number. A 64-bit binary number may be sufficient to uniquely represent $2^{30}$ different concept nodes of the social-networking system. For yet another example, the computing devices may generate a 32-bit binary number for a suffix of a map tile identifier. That is, a map tile identifier may be converted to a 32-bit binary number. A 32-bit binary number may be sufficient to uniquely represent $2^{15}$ different map tiles for maps stored in the social-networking system. Particular embodiments contemplate any suitable suffix object types. For example and without limitation, a suffix object type may correspond to a user, a place, a concept, a map tile, a post, a photo, a place, an application, an event, a web page, or a video.

In particular embodiments, the computing devices may generate the first binary number by concatenating the second and the third binary number. For example, the first binary number for the search term "friends:<177>" may comprise a 10-bit (second) binary number representing the prefix "friends:", concatenated by a 37-bit (third) binary number representing the suffix <177>. Thus, the first binary number for the search term "friends:<177>" has a length of 47 bits. For another example, the first binary number for the search term "tagged_in_photo:<65199>" may comprise a 10-bit (second) binary number representing the prefix "tagged_in_ photo:", concatenated by a 64-bit (third) binary number representing the suffix <65199>. Thus, the first binary number for the search term "tagged_in_photo:<65199>" has a length of 74 bits. For yet another example, the first binary number for the search term "places_in:<752039>" may comprise a 10-bit (second) binary number representing the prefix "places_in:", concatenated by a 32-bit (third) binary number representing the suffix <752039>. Thus, the first binary number for the search term "places_in:<752039>" has a length of 42 bits.

In particular embodiments, at step 340, for the each search term, the computing devices may access and retrieve one or more search results of the each search term from one or more data stores by hashing the first binary number. The computing devices may hash the first binary number with a suitable hash function. That is, the data stores may index search results for the first binary number corresponding to the each search term with one or more hash tables associated with the hash function. In some embodiments, the computing devices may apply an invertible transform function to the first binary number before hashing the first binary number with a suitable hash function. In this case, the first binary number may have a "lumpy" characteristic in that most of "1" bits are within a certain range of bits in the first binary number. The invertible transform function may transform the lumpy first binary number to a more uniformly distributed form (e.g., "1" bits are more uniformly distributed among all bits of the first binary number), thus avoiding possible collisions associated with the hash function. Here, an invertible function F has a behavior in that $x=F^{-1}(F(x))$, where $F^{-1}$ is the inverse of F.

In particular embodiments, the data stores may maintain a plurality of hash tables. Each hash table may index search results for search terms of a particular suffix object type. That is, the data stores may index search results based on an object type of a search term's suffix. For example, the data stores may maintain a hash table for search terms with suffixes of user object type (e.g., "friends:<177>" wherein the suffix <177> is a user identifier). The data stores may maintain another hash table for search terms with suffixes of concept object type (e.g., "tagged_in_photo:<65199>" wherein <65199> is a concept identifier). The data stores may maintain yet another hash table for search terms with suffixes of map tile object type (e.g., "places_in:<752039>" wherein <752039> is a map tile identifier). In addition, each hash table may comprise one or more prefix maps that may index prefixes of search terms. In one embodiment, each of the data stores may be configured to store objects of a single object type. For example, a data store may be configured to store user objects (and information associated with each stored user object). Another data store may be configured to store concept objects (and information associated with each stored concept object). A third data store may be configured to store map tile objects (and information associated with each stored map tile object). Each of the data stores may comprise one or more hash tables described above.

In comparison, without using different-length binary numbers to represent search terms based on each search term's suffix object type described above, a long binary number may be used to represent any search terms for any suffix object type (or lack thereof). For example, a 96-bit binary number can be used to uniquely represent any search terms for the social-networking system. However, a corresponding single hash table used to index search terms represented by 96-bit binary numbers can be much larger than the hash tables used to index the search terms with the shorter binary numbers described earlier. That is, particular embodiments may determine a search term's structure in the search terms' prefix and suffix, and represent the search term with a shorter binary number based on the suffix's object type, thus reducing sizes of the hash tables. For example, particular embodiments may reduce a total size of the hash tables by more than 20 percent for the social-networking system.

In one embodiment, the computing devices may generate the first binary number without generating a second binary number and a third binary number as described before. For example, the computing devices may generate a 64-bit binary number representing a search term, if the computing devices cannot determine a prefix or a suffix for the search term. The computing devices may access and retrieve from the data stores one or more search results for the search term by hashing the 64-bit binary number.

In particular embodiments, at step 350, the computing devices may aggregate search results of the respective search terms. For example, for the received search query "Who are common friends of John and Bob?" described earlier, the computing devices may retrieve a first set of results (e.g., users <1>, <3>, <11>) from the data store for the search term "friends:<177>." The computing devices may retrieve a second set of results (e.g., users <1>, <11>, <17>, <28>) from the data stores for the search term "friends:<213>." The computing devices may aggregate the search results by applying AND operation to the first and second sets of results, yielding an aggregated search results (e.g., users <1>, <11>).

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
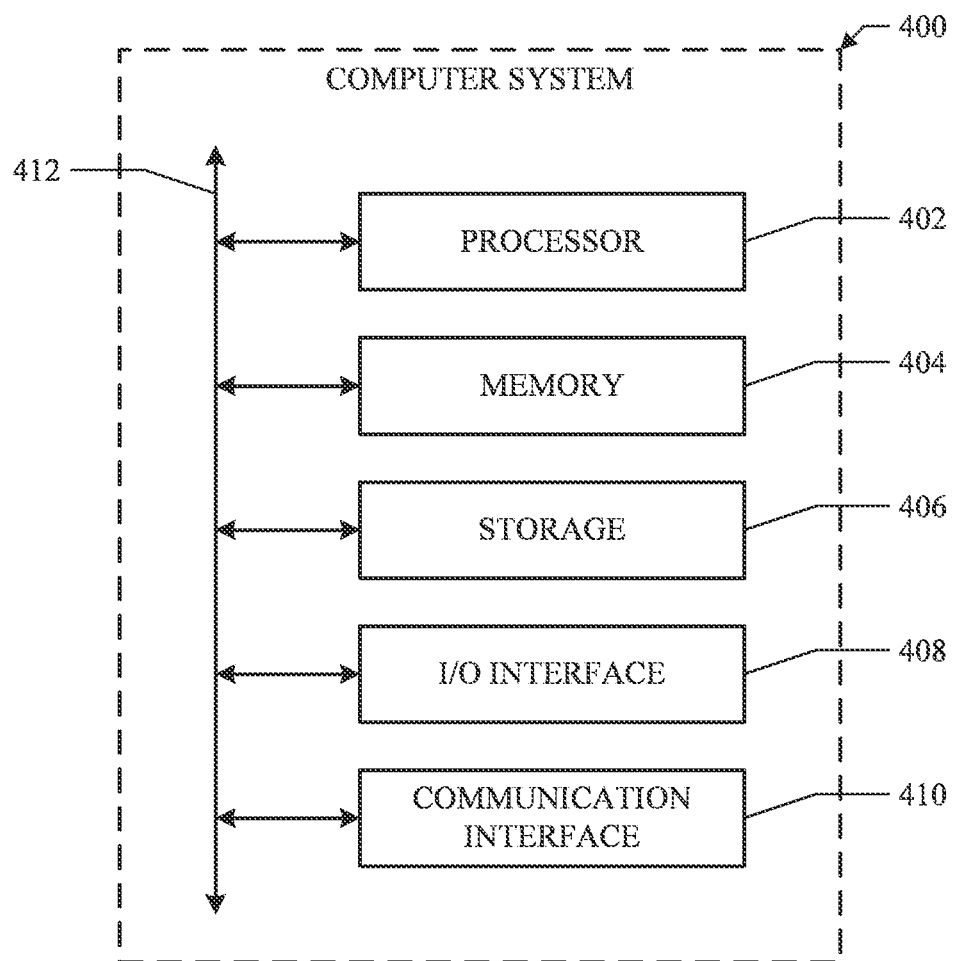
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices:
   receiving, from a client device of a first user of an online social network, a search query inputted by the first user;
   determining one or more search terms based on the received search query, each search term comprising a prefix and a suffix, wherein each prefix corresponds to an edge type and an object type of a social graph of the online social network, and wherein each suffix corresponds to a particular node of the social graph;
   determining, based on an object type corresponding to the suffix of each search term, a suitable hash function from a plurality of hash functions;
   identifying one or more search results matching the search query by applying the determined hash function to a first binary number associated with each search term to generate a hash value, wherein the one or more search results match the hash value; and
   sending, to the client device of the first user in response to the search query, one or more identified search results.

2. The method of claim 1, wherein the social graph comprises a plurality of nodes and a plurality of edges connecting the nodes, each edge being of a particular edge type and each node corresponding to an object associated with the online social network having a particular object type.

3. The method of claim 2, wherein the object corresponds to a user, a concept, or a map tile.

4. The method of claim 1, wherein identifying one or more search results matching the search query by applying the determined hash function to each search term comprises:
   generating the first binary number based on the prefix and suffix of the search term;
   generating the hash value by applying the determined hash function to the first binary number;
   accessing a hash table associated with the determined hash function; and
   retrieving one or more search results matching the hash value.

5. The method of claim 4, further comprising applying an invertible transform function to the first binary number.

6. The method of claim 4, wherein a length of the first binary number is based on an object type corresponding to the suffix.

7. The method of claim 4, wherein the first binary number is generated by:
   generating a second binary number based on the prefix;
   generating a third binary number based on an object type of the suffix; and
   concatenating the second and the third binary numbers.

8. The method of claim 7, wherein a length of the third binary number is determined based on the object type of the suffix.

9. The method of claim 4, wherein if the prefix or the suffix is determined to be a null value, then a length of the first binary number is a pre-set length.

10. The method of claim 1, wherein the search query inputted by the first user is a structured text string.

11. The method of claim 1, wherein the search query is received via a PHP process hosted by the online social network.

12. One or more computer-readable non-transitory storage media embodying software that is operable when executed to:
   receive, from a client device of a first user of an online social network, a search query inputted by the first user;
   determine one or more search terms based on the received search query, each search term comprising a prefix and a suffix, wherein each prefix corresponds to an edge type and an object type of a social graph of the online social network, and wherein each suffix corresponds to a particular node of the social graph;
   determine, based on an object type corresponding to the suffix of each search term, a suitable hash function from a plurality of hash functions;
   identify one or more search results matching the search query by applying the determined hash function to a first binary number associated with each search term to generate a hash value, wherein the one or more search results match the hash value; and
   send, to the client device of the first user in response to the search query, one or more identified search results.

13. The media of claim 12, wherein the social graph comprises a plurality of nodes and a plurality of edges connecting the nodes, each edge being of a particular edge type and each node corresponding to an object associated with the online social network having a particular object type.

14. The media of claim 12, wherein the software that is operable when executed to identify one or more search results matching the search query by applying the determined hash function to each search term comprises software that is operable when executed to:
   generate the first binary number based on the prefix and suffix of a search term;
   generate the hash value by applying the determined hash function to the first binary number;
   access a hash table associated with the determined hash function; and
   retrieve one or more search results matching the hash value.

15. The media of claim 14, wherein the first binary number is generated by:
   generating a second binary number based on the prefix;
   generating a third binary number based on an object type of the suffix; and
   concatenating the second and the third binary numbers.

16. The media of claim 15, wherein a length of the third binary number is determined based on the object type of the suffix.

17. The media of claim 14, wherein if the prefix or the suffix is determined to be a null value, then a length of the first binary number is a pre-set length.

18. A system comprising: one or more processors; and a memory coupled to the processors comprising instructions executable by the processors, the processors being operable when executing the instructions to:
   receive, from a client device of a first user of an online social network, a search query inputted by the first user;

determine one or more search terms based on the received search query, each search term comprising a prefix and a suffix, wherein each prefix corresponds to an edge type and an object type of a social graph of the online social network, and wherein each suffix corresponds to a particular node of the social graph;

determine, based on an object type corresponding to the suffix of each search term, a suitable hash function from a plurality of hash functions;

identify one or more search results matching the search query by applying the determined hash function to a first binary number associated with each search term to generate a hash value, wherein the one or more search results match the hash value; and send, to the client device of the first user in response to the search query, one or more identified search results.

19. The system of claim 18, wherein the social graph comprises a plurality of nodes and a plurality of edges connecting the nodes, each edge being of a particular edge type and each node corresponding to an object associated with the online social network having a particular object type.

20. The system of claim 19, wherein the object corresponds to a user, a concept, or a map tile.

21. The system of claim 18, wherein the instructions to identify one or more search results matching the search query by applying the determined hash function to each search term comprises instructions to:

generate the first binary number based on the prefix and suffix of the search term;

generate the hash value by applying the determined hash function to the first binary number;

access a hash table associated with the determined hash function; and retrieve one or more search results matching the hash value.

22. The system of claim 21, wherein the processors are further operable when executing instructions to apply an invertible transform function to the first binary number.

23. The system of claim 21, wherein a length of the first binary number is based on an object type corresponding to the suffix.

24. The system of claim 21, wherein the first binary number is generated by:

generating a second binary number based on the prefix;

generating a third binary number based on an object type of the suffix; and concatenating the second and the third binary numbers.

25. The system of claim 24, wherein a length of the third binary number is determined based on the object type of the suffix.

26. The system of claim 21, wherein if the prefix or the suffix is determined to be a null value, then a length of the first binary number is a pre-set length.

27. The system of claim 18, wherein the search query inputted by the first user is a structured text string.

28. The system of claim 18, wherein the search query is received via a PHP process hosted by the online social network.

29. The method of claim 1, wherein the plurality of hash functions correspond to a plurality of object types.

* * * * *